Figure 1:
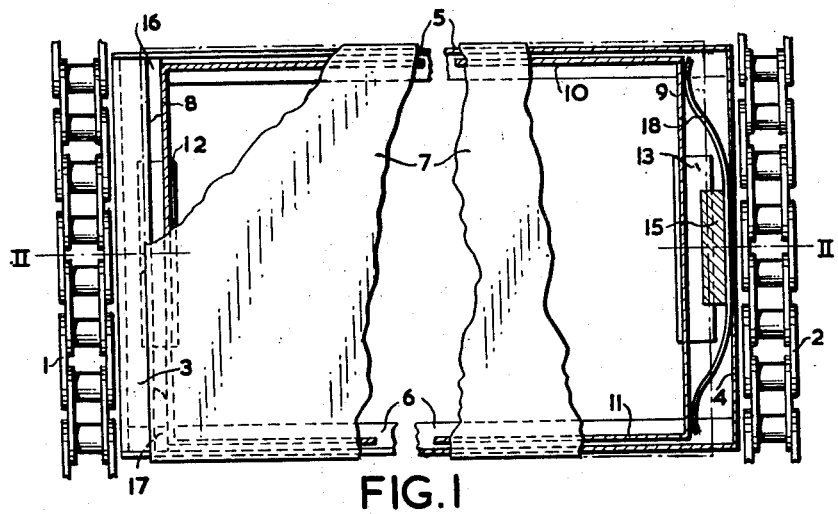

March 26, 1963  IB JØRGEN JACOBSEN  3,082,709
MOULD AND ASSOCIATED MOULD CARRIER FOR CONFECTIONARY
MASS MOULDING MACHINES AND THE LIKE PLANTS
Filed March 29, 1961

INVENTOR

Ib Jørgen Jacobsen

BY

Stevens, Davis, Miller & Mosher ATTORNEYS

United States Patent Office 3,082,709
Patented Mar. 26, 1963

3,082,709
MOULD AND ASSOCIATED MOULD CARRIER FOR CONFECTIONARY MASS MOULDING MACHINES AND THE LIKE PLANTS
Ib Jørgen Jacobsen, Soborg, Denmark, assignor to Mikrovaerk A/S, Soborg, Denmark
Filed Mar. 29, 1961, Ser. No. 99,300
Claims priority, application Denmark Apr. 9, 1960
2 Claims. (Cl. 107—8)

This invention relates to a mould and associated mould carrier for confectionary mass moulding machines in which the mould may from above be inserted in the mould carrier and by displacement in its own plane in relation to the mould carrier be detachably locked thereto by engagement between the supporting frame of the mould and the mould carrier.

Such arrangement is known in advance wherein the detachable locking between the mould and the mould carrier is provided by so-called bayonet locks, the mould having in the vicinity of each of its four corners a projecting pin while the mould carrier has corresponding angular grooves terminating in the upper edge thereof. When the mould is to be placed in the mould carrier, each of the pins is introduced into the corresponding groove by a vertical movement and the mould is then displaced horizontally until the pins come into engagement with the closed ends of the grooves. A detachable, for example spring-loaded, stop is then brought into engagement with the mould so as to prevent the mould from being unintentionally displaced in backwards direction.

The mould with associated mould carrier according to the invention differs from this known arrangement in that at two opposed frame members the supporting frame of the mould is provided with flanges or similar projections which protrude from the frame and may be engaged below corresponding locking projections provided on the mould carrier, said locking projections having a spacing which is smaller than the distance between the outer faces of the projections of the supporting frame but is greater than the distance from one of said outer faces to the outer face of the opposed supporting frame member, so that the mould can be edged down into the mould carrier and then be displaced to a normal position in which locking engagement is established at both sides.

In this case the mould is kept in a more or less inclined position when it shall be inserted in the mould carrier, and the lowermost side of said mould is brought into engagement with the associated locking projection on the mould carrier. Then the mould is displaced to this side sufficiently to allow the opposed supporting frame projection to pass the other locking projection of the mould carrier so that the mould is now horizontally located. By a backwards-directed displacement of the mould, the engagement is established between the last-mentioned projections but this displacement is insufficient to release the engagement first established at the opposite side of the mould and mould carrier.

By this arrangement it is particularly easy to insert the mould in the mould carrier since it is not necessary as is the case with the above-mentioned known construction, to take care that a plurality of more or less concealed pins are simultaneously introduced into their corresponding guiding grooves. Also the removal of the mould from the mould carrier is effected very easily and quickly by the arrangement according to the invention.

The mould is preferably spring-loaded in a direction towards its normal position. This spring load which may easily be overcome during the insertion of the mould in the mould carrier makes it unnecessary to use special stops which, if used, would have to be manually detached or released prior to the removal of the mould from the mould carrier.

In its normal position the mould is preferably in firm engagement against one mould carrier side and is loaded by a spring, preferably a leaf-spring with free ends, secured to the opposite side of the mould carrier. The object of this measure is to ensure that the mould is by simple means effectively secured in its correct position in relation to the mould carrier and, consequently, in relation to the other component parts of the moulding machine, particularly to its casting unit.

The opposed frame members comprising the projections may expediently be of channel formation and may have an internal width which is only slightly greater than the height of the locking projections of the mould carrier. Consequently, the said frame members may form a kind of forks which ride on the locking projections of the mould carrier and, in so doing, provide for the desired retention of the mould in its normal position.

Figure 2:
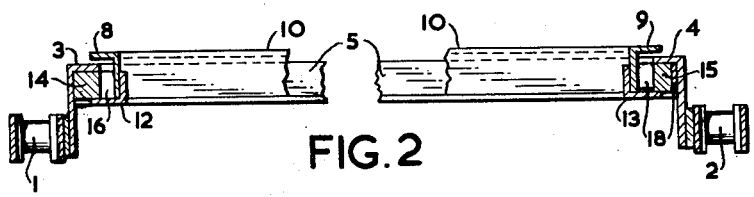

The invention will now be more fully explained with reference to the accompanying drawing, on which FIG. 1 is a plan view of a mould with associated mould carrier according to the invention, partially in section and with certain parts cut away for the purpose of perspecuity, and FIG. 2 is a vertical section along the line II—II in FIG. 1.

In the drawing, 1 and 2 designate two parallel chains carrying between them a number of mould carriers of which only one is shown in the drawing. This mould carrier consists principally of a rectangular frame formed of angle irons. The two angle irons 3 and 4 are secured rigidly to the inner faces of opposite inner links of and are parallel to the chains 1 and 2, and have their horizontal flanges located at the top, while the two angle irons 5 and 6 perpendicular to the chains have their horizontal flanges lying below. The height of the last-mentioned angle irons is substantially less than that of the angle irons 3 and 4.

The mould is in a conventional manner composed of a mould plate 7, which is illustrated fractionally in FIG. 1 without moulding cavities, and has a supporting frame which like the mould carrier comprises four L-irons 8, 9, 10 and 11. These four supporting frame members are all of the same height and have their horizontal flanges lying at the top and projecting outwardly from the center of the mould.

In the position illustrated on the drawing, the supporting frame of the mould rests with the lower faces of the members 10 and 11 on the upper faces of the horizontal flanges of the members 5 and 6 of the mould carrier.

At the lower edge of the frame members 8 and 9 there are secured angular elements 12 and 13 forming outwardly projecting retainers, or the projections of the supporting frame as mentioned in the foregoing. In the normal position of the mould each of these angular elements engages below a mould retaining means comprising a locking projection 14 or 15 on the L-irons 3 and 4 of the mould carrier. In combination with the frame member 8 or 9 the angular element 12 or 13 forms a channel, the internal width of which is only slightly greater than the height of the corresponding locking projections 14 and 15 including the horizontal flanges of the mould carrier members 3 and 4.

In the vicinity of its ends, the mould carrier member 3 is provided with inwardly projecting bosses 16 and 17 forming stationary abutment means or stops for the member 8 of the supporting frame of the mould, when the latter is in its normal position. At the opposite side there is, between the mould carrier member 4 and the locking projection 15, secured a leaf-spring 18 which with its free ends tends to keep the supporting frame of the mould carrier in firm engagement against the bosses 16 and 17.

When the mould is to be removed from the mould carrier, it is first displaced to the right hand side against the force of the spring 18 sufficient to release the angular element 12 on the frame member 8 from the locking projection 14 on the mould carrier member 3. Now, the left hand side of the mould may be raised from the mould carrier, and in a more or less inclined position the mould may then be displaced to the left so as to release also the engagement between the angular element 13 and the locking projection 15 at the other side.

The removal of the mould as well as its re-placing in the mould carrier which is effected by corresponding but oppositely directed movements may be effected extremely quickly and easily without the risk of the mould being placed in a wrong position in relation to the mould carrier. A further advantage of the embodiment illustrated in the drawing is that through its supporting frame, the mould is effectively supported by the mould carrier so that the movements of this mould carrier, for example by passing through a shaking apparatus, are safely transmitted to the mould proper.

What I claim is:

1. In a confectionary mass moulding machine comprising a series of interconnected mould carriers, each mould carrier comprising a rectangular frame having first and second opposed frame members of fixed spacing which are are provided with mould retaining means projecting towards the center of the mould carrier and having a fixed spacing from one another; and a mould comprising a rectangular mould plate supporting frame having two opposed frame members having vertical portions whose spacing is smaller than the fixed spacing of said mould retaining means, said opposed mould plate supporting frame members being provided with outwardly projecting retainers, the spacing of the outermost portions of which is greater than the fixed spacing of said mould retaining means but smaller than the fixed spacing of said first mould carrier frame member and said second mould carrier frame member; spring means provided between said first mould carrier frame member and the opposed mould plate supporting frame member to urge the mould plate supporting frame in a direction towards said second mould carrier frame member, and abutment means to stop said spring-urged mould plate supporting frame in a position in which each of said retainers engages beneath the associated mould retaining means to releasably lock the mould plate supporting frame to the mould carrier.

2. The combination as claimed in claim 1, wherein said opposed mould plate supporting frame members are of channel formation with an internal channel width that is only slightly greater than the height of said mould retaining means, one of the channel flanges of each of the opposed mould plate supporting frame members forming one of said retainers.

References Cited in the file of this patent

UNITED STATES PATENTS 2,163,965     Shriver et al.     June 27, 1939

FOREIGN PATENTS 62,521     Denmark     July 31, 1944